United States Patent [19]

Neuscheler et al.

[11] 3,995,168
[45] Nov. 30, 1976

[54] ELECTRO OPTICAL FLUID MEASUREMENT SYSTEM

[75] Inventors: Frederick Neuscheler, Lindenhurst; John J. Connelly, Northport, both of N.Y.

[73] Assignee: Grumman Aerospace Corporation, Bethpage, N.Y.

[22] Filed: Aug. 4, 1975

[21] Appl. No.: 601,931

[52] U.S. Cl. .............................. 250/577; 250/573; 250/227; 73/293
[51] Int. Cl.² .......................................... G01N 21/26
[58] Field of Search .............. 73/293; 250/573, 575, 250/576, 577, 227, 564

[56] References Cited
UNITED STATES PATENTS

| | | | |
|---|---|---|---|
| 3,120,125 | 2/1964 | Vasel | 73/293 |
| 3,553,666 | 1/1971 | Melone | 250/227 |
| 3,636,360 | 1/1972 | Oishi et al. | 250/577 |
| 3,683,196 | 8/1972 | Obenhaus | 250/227 |
| 3,773,426 | 11/1973 | Mudd | 250/564 |
| 3,844,171 | 10/1974 | Rodger | 73/293 |

*Primary Examiner*—Alfred E. Smith
*Assistant Examiner*—David K. Moore
*Attorney, Agent, or Firm*—Richard G. Geib; Mellor A. Gill

[57] ABSTRACT

A device for the outside display of the level and specific density of a liquid contained within a tank, particularly for inflammable liquids, characterized by a plurality of paired light pipes having optical interface means therebetween located at intervals within a support with electrical means operable by light energy from one of the pair of light pipes being conducted thereby due to a mismatch of the index of refraction caused by an absence of fuel at the area of the optical interface to provide a display of the fluid level and/or the density of the fluid within a tank.

35 Claims, 12 Drawing Figures

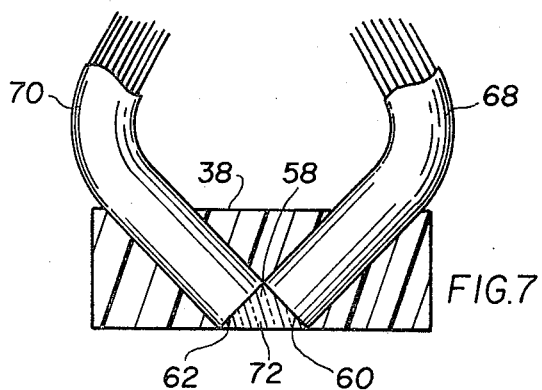
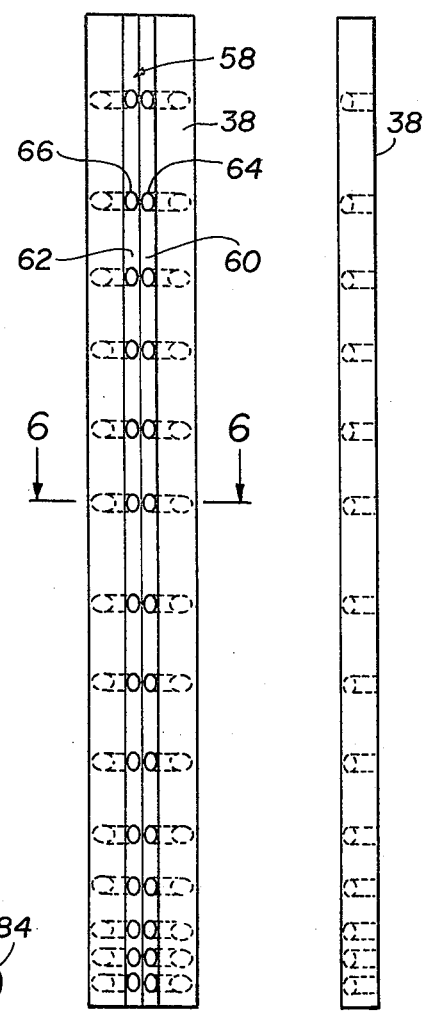
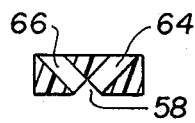
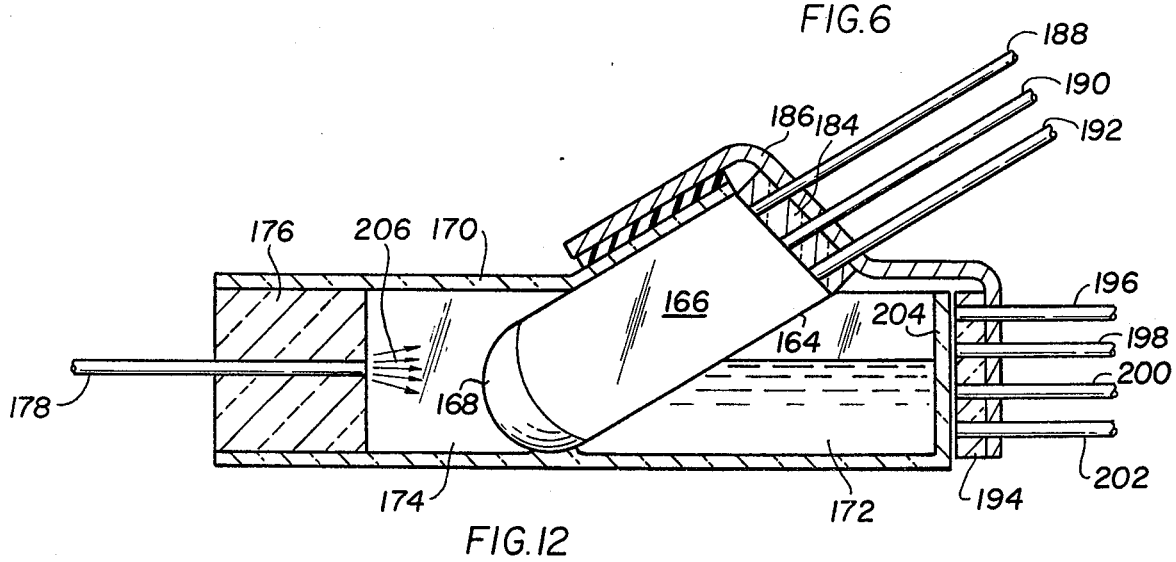

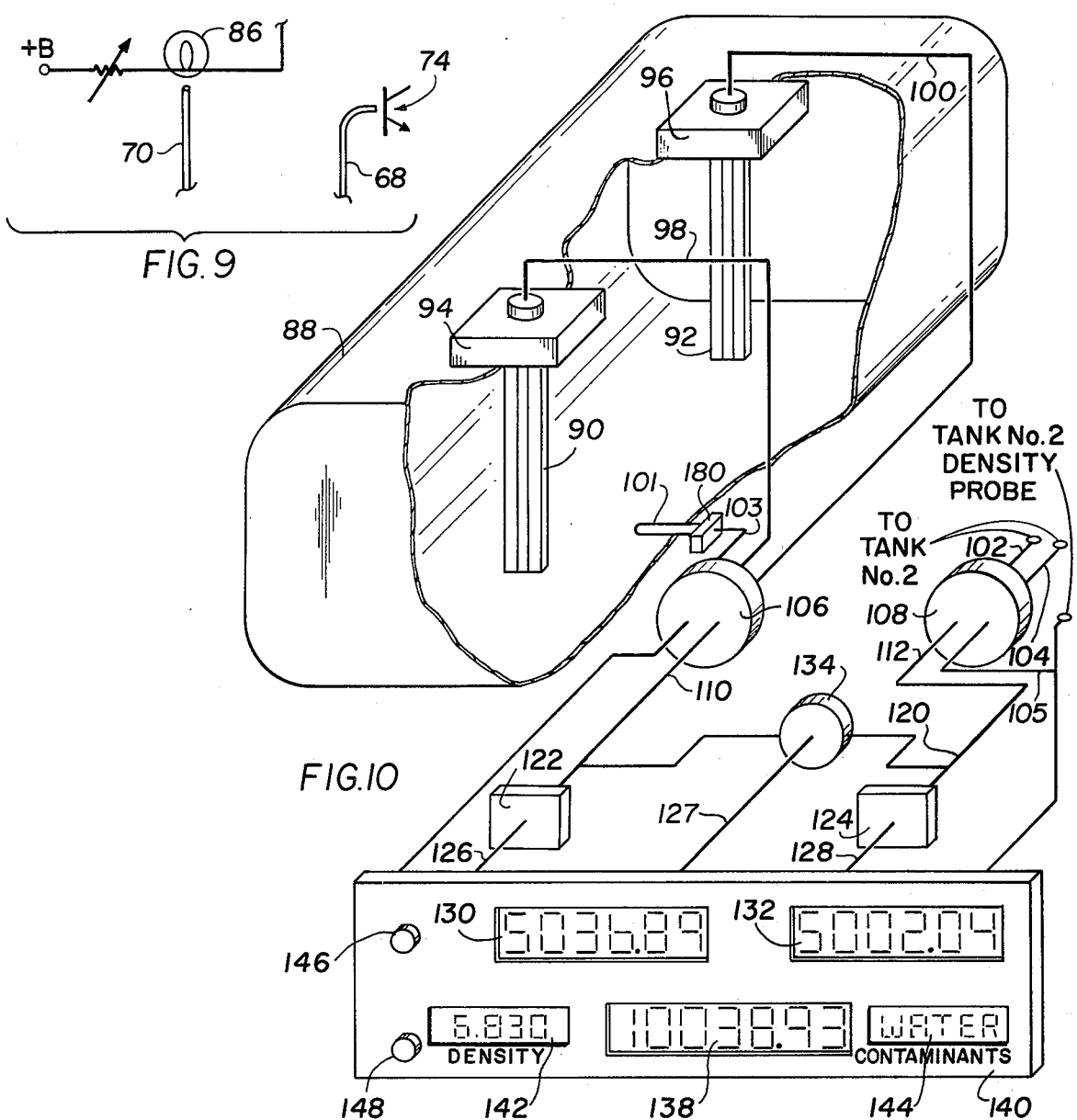

ELECTRO OPTICAL FLUID MEASUREMENT SYSTEM

BACKGROUND

Presently the state of art with regard to practical devices for measuring and displaying the level of a fluid contained within a tank have taken the form of mechanical devices, i.e., based on the displacement of a float or other analysis movable member, and electrically capacitive devices, i.e., based upon the change in capacitance of an electrical sensor as a result of a liquid or air capacitance link in an electrical circuit.

Attempts have been made to provide a passive system for the detection of a liquid within a tank utilizing elements to receive and redirect light by reflection when surrounded by a medium of different index of refraction than that of a liquid whose level is to be detected. An illustration of such attempts is provided by U.S. Pat. No. 3,120,125.

However, it has been the desire of these prior art attempts to look at the surface of the fluid within the tank along a horizontal plane or several horizontal planes through the tank.

With such designs it has been found that it is extremely difficult to mount the detecting apparatus in close proximity one to the other so as to monitor the small changes in fluid level within the tank and reflections from the top of a fluid can not accurately determine the density of the fluid when there is any disturbances in the fluid.

SUMMARY

It is, therefore, a principal object of this invention to improve upon the prior art by disclosing a fluid quantity measuring device that is of a passive nature and arranged so as to look at the vertical height of the fluid from a side thereof at a far greater number of locations then is heretofore possible with the prior art devices in the field of this invention.

Another object of this invention is to provide a fluid level and indicating system that is less susceptible to electronic interference, has no moving parts and is less susceptible to current leakage and stray capacitance and tank attitude.

A further object of this invention is to provide a fluid level indicating system that utilizes a probe and electronics which provide a manageable signal level to minimize cabling and connections problems thereby increasing reliability.

A still further object of this invention is to provide a digital fluid density measuring system which provides the fluid density, i.e. pounds per gallon, kilograms per liter, to compensate for fundamental differences between batches of fuels as well as temperature effects, thereby permitting the determination of fluid mass in the tank.

A still further object of this invention is to provide a warning signal when an unexpected fluid is present in the tank thereby protecting against situations where water is inadvertently placed or accumulates above a normal amount in an engine fuel tank.

A still further object of this invention is to provide a fluid measuring system whose sensitivity and accuracy improves as the fluid is consumed. More particularly capacitive measuring systems exhibit continuously increasing error as aircraft fuel is consumed especially when fuel quantity approaches the critical value. It is known, for example, in current large body aircraft that tank excess on the order of 3000 lbs. or more are allowed to accomodate measuring system errors to the detriment of payload.

A still further object of this invention is to provide a fluid level/ density indicating system for an aircraft having a multiplicity of tanks in which fuel probes may be utilized to provide a digital detection interface using a common or convenient scale factor in conjunction with a light source and photo detectors to sense fuel level/density and means may be utilized to readily combine signals of several probes to provide individual and total fluid level indication.

It is also an object of this invention to provide a means where the fluid level in several tanks can be combined with a density value (measured or extrapolated) to provide, in addition to fluid level, the weight of fluid remaining in each or all tanks.

A still further and particular object of this invention is to provide a fuel gauging system for an aircraft as a replacement for the analog capacitor type systems now being utilized which have proven to be notoriously inaccurate and unreliable. More particularly, it has been observed that the present state of the art capacitor type fuel gauging systems in aircraft are prone to various errors due to small signal variations caused by weather changes, wiring and connectors as well as other component malfunctions. Such systems have been routinely found to have errors exceeding one percent (1%) of tank capacity plus two percent (2%) of reading, before delivery from the factory. This is traceable to the scale factor of capacitive systems which are conventionally 1 picofarad ($1 \times 10^{-12}$ farads) per 57. pounds of fuel, assuming fuel weighs 7. pounds per gallon. With such errors an aircraft designed to carry 100,000 pounds of fuel can have 3000 pounds too much or too little fuel on board at takeoff. Should conditions develop where the indicated remaining fuel is 10,000 pounds the allowable system error is 12 percent or 1200 pounds of fuel. One may readily understand that as the tank empties, and available fuel becomes critical, the allowable capacitive system error becomes a symptotic to infinity.

With the present invention, however, and because of the discrete point indication that is possible by the use thereof, the magnitude of the errors in the system, if any, will not be inclusive of any fixed error as in the present state of the art capacitor type system used in aircraft.

DRAWING DESCRIPTION

FIG. 4 is a frontal view of a plate support for the indicator probe of FIG. 3;

FIG. 5 is a side view of the plate support;

FIG. 6 is a top cross sectional view of the plate support;

FIG. 7 is a cross sectional view of the plate support of FIG. 6 showing a paired light-pipe detector with an optical interface between the elements of the pair in accordance with the principals of this invention;

FIG. 8 is an electrical schematic of an indicator system which may be utilized with the fluid level indicator probe;

FIG. 9 is a schematic illustration of the light-pipe control of a portion of the electrical system shown by FIG. 8;

FIG. 10 is a isometric illustration of a multiple sensor and tank system and the electrical apparatus and display apparatus for a complete fluid level indicating system in accordance with the principals of this invention;

FIG. 11 is a block diagram of a logic circuit for controlling the display apparatus of FIG. 10; and FIG. 12 is a cross-sectional view of a densimeter/water detector in accordance with this invention.

Figure 1:
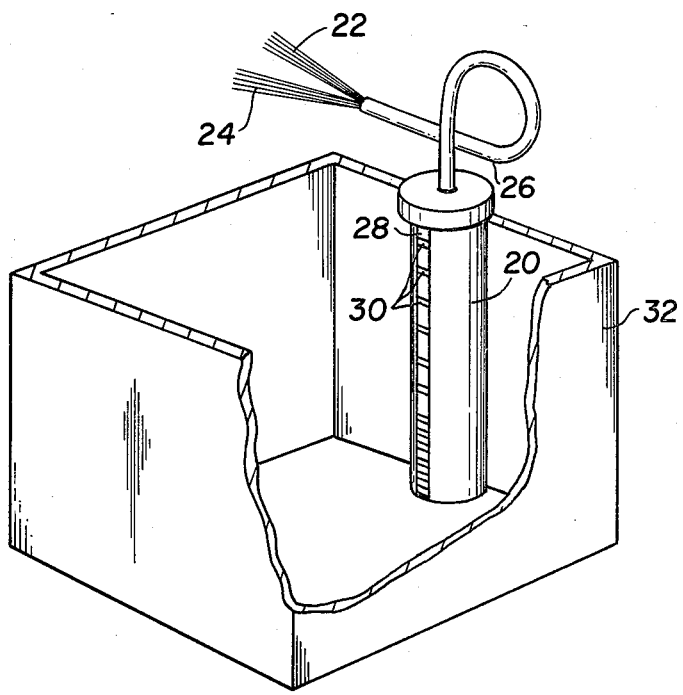
FIG. 1 is an isometric view of a rectangular shaped tank embodying a fluid level indicator probe with detector spacing in accordance with the principals of this invention.

The underlying concept of the invention is in the utilization of Snell's law in reflecting light from an air/liquid-probe interface (index of refraction mismatch). As seen by FIG. 1 the fluid level probe 20 is a housing containing a group of light transmitting fiber-optic bundles 22 and a group of light conducting fiber-optic bundles 24 carried to and from the housing by a conduit 26. The aforesaid fiber-optic bundles 22 and 24 are supported by a plate 28 on one face of the housing 20 to emerge in paired groups, as will be detailed hereinafter, at a multiplicity of locations 30 from the top to the bottom of tank 32 within which the probe 20 is located. Increased sensitivity is achieved as the fluid in the tank is exhausted by decreasing the spacing between the fiber optic bundles, as shown at the lower end of plate 28.

Figure 2:
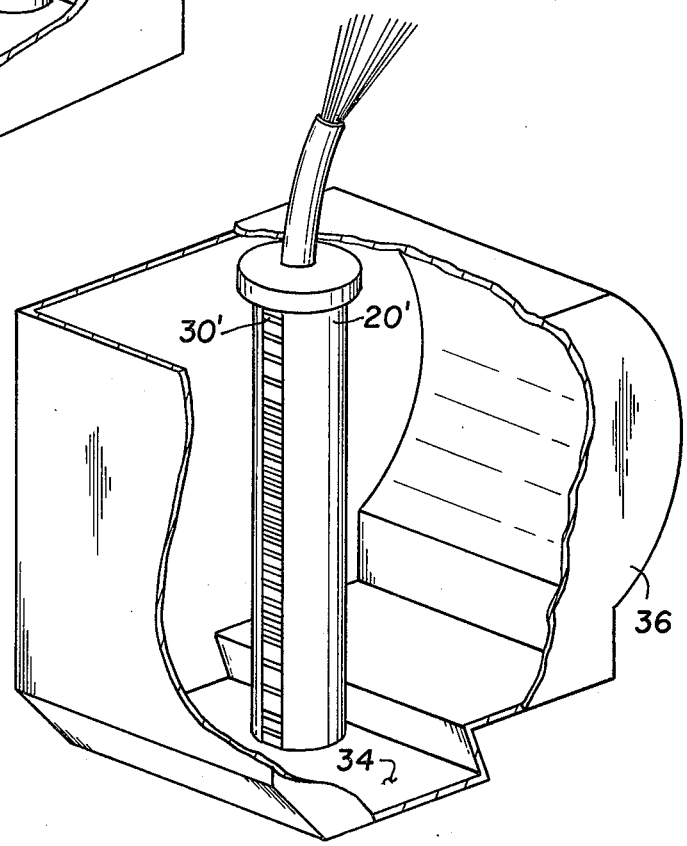
FIG. 2 is an isometric view of an irregular shaped tank embodying a fluid level indicator probe with irregular detector spacing in accordance with the principals of this invention.

As seen by FIG. 2 the probe 20' is located within the deepest well 34 of a tank 36 of irregular shape and the discrete locations of the paired light pipe is varied so as to accommodate the irregular volume of the tank from its top to the deep-most well 34.

Figure 3:
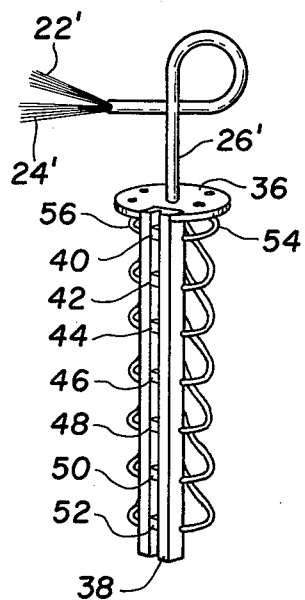
FIG. 3 is an isometric view of a fluid level indicator probe as utilized in FIGS. 1 and 2.

Turning next to FIG. 3 the plate support for the paired light-phase is shown in more detail to have a mounting flange 36 for a plate 38 having a plurality of windows (optical-Interfaces) 40, 42, 44, 46, 48, 50, 52 in the frontal face of the plate 38. As seen the conduit 26' within which is carried the group of fiber-optic bundles 22' and 24' emerges behind the plate 38 such that individual pairs (54 and 56 being representative) of the fiber-optic means enter the plate 38 to terminate adjacent the aforesaid windows. Plate 38 is more particularly detailed by FIG. 4 to comprise a thin, elongated rectangular structure 58 where a series of openings 64 and 66 are provided from the back to the front face of the plate 38 at an angle therewith. The openings may be elongated slots where spacers may fill between the fibers. In FIG. 6 the nature of the optical detection interface is more particularly illustrated for a preferred form of the invention.

Next with reference now to FIG. 7 the plate 38 is shown having surfaces 60 and 62 of a triangular cavity at a 45° angle with the plate face whereby sheathed fiber-optic elements 68 and 70 may be inserted from behind the plate to the cavity to terminate at a plane parallel with the respective surfaces 60, 62 so that the terminal ends of the fibers 68 and 70 make an angle with respect to each other the same as that of the surfaces 60 and 62. Also the fibers 68 and 70 have their outermost edges substantially on a plane of the face of the plate 38. It is not necessary to hold to this angle as it is only required that between the terminal edges of the fibers 68 and 70 an optical interface 72 is formed. The optical interface 72 is a glass or clear plastic prism-like structure. It may be formed to not only exist between the terminal edges of fiber 68 and 70 but as means to align and space the fibers when slots are formed in the plate 38 rather than drilled openings.

With reference now to FIG. 8 there is shown an electrical system to be mated with the fiber-optic elements utilizing a plurality of phototransistors 74 between a power source 76 and a plurality of inverters 78 connected by a plurality of resistors 80 to an amplifier 82 operating analog indicator 84. The inverters 78 are used to show liquid remaining in a tank. To show liquid expended they would not be required. As seen in FIG. 9, one of the many fiber-optic elements 70 within the group is exposed to a light 86 and another of the fiber-optic elements 68 operably related to phototransistor 74 so that whenever the light transmitted by the element 70 is reflected to the element 68, as would occur whenever liquid level is below 72, the phototransistors 74 will pass a signal to the inverter 78 that via resistor 80 and amplifier 82 will control indicator 84. With reference now to FIG. 10 there is shown an aircraft fuel tank 88 within which have been located a plurality of plate supporting detector means 90 and 92 similar to that shown by FIG. 3. Plates 90 and 92 are connected to housings 94 and 96 affixed to the outer panel of the tank top surface or even further remotely located. Within these housings are means to provide necessary light and phototransistor means, as aforesaid for communicating an electrical signal via lines 98 and 100 whenever there is a mismatch of the index of refraction at any or all of the locations of the discrete level indicators in the supports 90 and 92. As indicated by FIG. 10 any number of tanks are possible and a two tank system is referenced thereby having a tank number 2 within the system with electrical signals being provided therefrom via lines 102 and 104. The means to provide necessary light could be by a simple lamp, a pulsed light source or natural light. In an aircraft it could be sunlight in the day and wing lights at night. The conducting elements 68 can be shifted in position or angle with respect to transmitting elements 70 to optimize the system for different fluids to be measured.

As seen a fuel density/contaminent probe 101 is provided within the tanks to provide an electrical signal via lines 103 (105) to an electrical multiplying circuit 106 (108). This will permit factoring of the electrical signals from lines 98 and 100 in the summation of the signals via lines 98 and 100 (102 and 104) so as to provide signals via lines 110 and 112 that will reflect the fuel in pounds remaining within the tank 88. The signals are directed to circuits 122, 124 and a summing circuit 134 and thereafter communicated via lines 126, 127 and 128 to individual and total digital displays 130, 132 and 138. The displays 130, 132, 138 are contained in a display board 140 at a crew station in the aircraft. Display board 140 may also be provided with density indicator 142 and a contaminate warning indicator 144 as well as with calibrating controls 146 and 148 for the fuel level indicating system.

The housings 94 and 96 regardless of location on the tank or remote thereof in addition to containing the light source and the phototransistors or light diode elements of the detectors means of this invention can also include a logic network as shown by FIG. 11 having exclusive OR networks 150 and 152 providing true-false logic to binary decoders 154 and 156 whose outputs are summed by appropriate circuitry 158 and communicated to a binary divide by 2 circuit 160 to provide an output via a lead 162 to the multiplying circuit 106 and 108. The divide by 2 circuit 160 may well be contained remotely within the multiplying circuits 106 and 108, as shown by FIG. 10, rather than within the housings 94 and 96.

With respect to FIG. 12 there is shown an electro-optical densimeter/ water detector 164 such as may be employed as the probe 101 is shown in tank 88 in place of other devices on the market to enable achieving similar advantages as the afore-described measuring system of:
1. Passive hardware within the tank.
2. Lightweight.
3. Inexpensive.
4. Adequate Resolution.
5. Manageable Signal Levels.
6. Easy Calibration.
7. Elimination of EMI interference problems both as to transmission and reception.
8. In addition the detector 164 (101) has a distinct advantage in its ability to measure absolute density by accounting for variations in density of delivered fluid and changes in temperature of the fluid.

The densimeter/contaminent detector 101, as with the devices above, has an electronics housing 180 within which or to which a light source will illuminate a fiber optic element, such as element 178, and a semiconductor means sensitive to light being conducted by other fiber optic elements related thereto, such as elements 188, 190, 192, 196, 198, 200 and 202. Actually the conducting fiber optic elements may be of tape construction rather than the sheathed, tubular, individual bundles shown. Also, as with the probes 90 and 92, the detector uses the principle of Snell's law of reflecting/refracting light at an inclined optical surface 164 of a clear elongated lens 166 having an aspherical end 168 within a housing 170, preferably a clear plastic housing. Lens 166 and its aspherical end cooperate with the walls of housing 170 to separate a liquid chamber 172 from an air chamber 174. As shown the housing is closed at one end by a block 176 that is formed, bored, etc. to receive a fiber optic bundle 178. Actually block 176 could be slit to allow sunlight or any light source to radiate into air chamber 174. The lens 166 is also provided with a block 184 that is bonded to a support frame 186 that mounts the bundles 188, 190 and 192 or a tape construction of fiber optic elements. Frame 186 curves about the other end of the housing 170 to support a block 194 supporting, in turn bundles 196, 198, 200 and 202 or a tape construction adjacent the end 204 of housing 170. With tape constructions it will be readily recognized by one skilled in the art that the exposed ends will be on the inside of blocks 184 and 194 as is the case with the bundles shown.

The bundle 178, when used as a means to transmit light, will transmit same through chamber 174 in a spherical radiation pattern shown by arrows 206. In that aspherical end 168 has one radius of curvature in the plane of FIG. 12 and another in the plane of surface 164, light received thereby will be directed to a focal point along the surface 164 and/or to a focal point adjacent the end of lens 166 with which block 184 is associated, so that the light within the lens 166 is either reflected and/or refracted at surface 164 so as to illuminate bundles 188, 190 or 192 or a combination of same or bundles 196, 198, 200 or 202 or a combination of same, respectively.

Actually one block with a fiber optic ribbon tape can be used at a preselected pitch to the axis of lens 166 and the housing 170. With such one skilled in the art will be able to limit the digitizing error to the pitch selected of detector elements The housing 170 is provided with openings in any events to permit chamber 172 to receive fluid that is within the tank 88 at a limited distance above the bottom thereof. This will enable the probe to be effective indicating contaminants above an expected level. In any event the light received by the bundles 188, 190, 192, 196, 198, 200 and 202 will be indicative of density at one end of the bundles and comtamination at the other so that appropriate summing circuitry will enable the proper electrical signal to show density, as at indicator 142, or warn of contamination such as too much water in the fuel, as at indicator 144.

With the above detector fluid density can be indicated without passing light through fuel, as is also true for measuring tank content. Therefore, shadings of fuel color, etc. do not affect the system.

By providing a plurality of fiber optic bundles and individual light sensitive semiconductor means in the densimeter/contaminant probe not only is the failsafe features of this probe, also common to the level probes 90, 92, provided, but in addition, it is possible to trigger a warning of unmanageable contamination at a predetermined level of same on the surface 164 as well as triggering a density reading in units in that the angle of surface 164 will cause reflection of varied order as fuel density changes. That is to say certain of the optical fibers will be illuminated in blocks 184 and 194 as contaminant level in chamber 172 varies or as differing fuels are employed having different density or as the density varies because of changes in temperature.

Having described an operative construction of the invention it is now set forth in the terms to describe the protection sought by these Letters Patent in the appended claims:

1. A fluid level indicating means for a tank comprising:
a support extending from one surface of the tank through a full range of fluid level variations to be measured for the tank, said support having a triangular cavity on a face thereof exposed to the fluid and a plurality of vertically close openings to the cavity;
a first group of fiber optic bundles carried by the support in one set of the openings to extend to the terminate thereat; thereof;
a second group of fiber optic bundles carried by the support in another set of the openings to extend to another side of the cavity to terminate at said other side;
solid means closing said cavity to create an optical interface perpendicular of the support between terminal ends of said first group and terminal ends of said second group;
means to project optical energy by one of said first or second groups; means to convert optical energy to electrical energy as a result of optical energy in the other of said first or second groups, said optical energy being provided in the other of said first or second groups by an index of refraction mismatch at said solid means creating an optical interface according to Snell's law based upon reflection of energy from one group to the other group because of one type of fluid interface and a dispersion of energy because of another type of fluid interface with terminal ends of said first and second groups; and means to receive said electrical energy and use same to indicate fluid level.

2. A fluid level indicating means according to claim 1 wherein said triangular cavity is formed to have sides normal to each other and said first group and said second group terminate in planes that have a similar normal relationship.

3. A fluid level indicating means according to claim 1 wherein said first group and said second group of fiber optic bundles are located adjacent the cavity to have their terminal ends at the sides of the cavity within the support such that said terminal ends lie in different planes intersecting at a predetermined angle with respect to each other.

4. A fluid level indicating means according to claim 1 wherein the means to convert electrical energy is comprised of semiconductor means valving electrical energy in accordance with optical energy.

5. A fluid level indicating means according to claim 1 and further comprising a means to measure fluid density by optical energy and provide electrical signals thereof to said means to receive electrical energy to factor in density in indicating fluid level.

6. A fluid level indicating means according to claim 4 wherein said semiconductor means provides electrical energy to means to transfrom same into signals of fluid remaining in said tank.

7. A fluid level indicating means according to claim 5 wherein said means to receive electrical energy transforms level and density indications into signals of fluid remaining in said tank.

8. A fluid level indicating means according to claim 4 wherein said means comprises inverters providing a signal to an amplifier providing an indicator signal of manageable spread of quantity of fluid remaining in a tank.

9. A fluid level indicating means according to claim 6 wherein said means comprises inverters providing a signal to an amplifier providing an indicator signal of manageable spread of quantity of fluid remaining in a tank.

10. A fluid level indicating means according to claim 6 wherein the means comprises logic gate means to provide true false logic to decoder means that provides digital signals for display means.

11. A fluid level indicating means according to claim 7 wherein the means comprises logic gate means to provide true false logic to decoder means that provides digital signals for display means.

12. The structure of claim 7 wherein the electrical energy and signals are provided to digital conversion means to operate an digital display.

13. The structure of claim 5 wherein the electrical energy and signals are provided to digital conversion means to operate an digital display.

14. In a supply system a means to measure quantity of the supply, said means comprising:
a container for the supply;
a plate member located within said container, to extend from bottom to top thereof having a plurality of holes opening at a face thereof, said holes being at closely adjacent preselected numerous intervals along said plate member from bottom to top and at each interval being paired and drilled to have the axis of two such holes intersecting;
a plurality of light transmitting elements from without said container and extending thereinto adjacent said plate member to emerge through one of said paired holes at said preselected vertical intervals at an angle such that a plane of the end of said light transmitting elements intersects a plane of the face of said plate member;
a plurality of light conducting elements from without said container and extending thereinto adjacent said plate member to emerge through another of said paired holes at said preselected intervals at an angle such that a plane of the end of said light conducting elements intersects said plane of the end of the light transmitting elements and said plane of the face of said plate member to form a cavity defined by the end planes of the light transmitting and light conducting elements and the plane of the face of the plate member; and
a clear enclosure bridging and sealing between the light transmitting end and the light conducting end adjacent said cavity to have a face parallel with the face of said plate member whereby, when air is all that is adjacent the clear enclosure, light will be reflected via the enclosure from the light transmitting element to the light conducting element at the interval where paired.

15. The means to measure of claim 14 and further comprising electrical means controlled by said light conducting members, said electrical means being operatively connected to a display means.

16. The means to measure of claim 15 and further comprising means to provide density/contamination measurements for computation by said electrical means, said means to provide density contamination measurements including:
a probe within the container at a predetermined location above the bottom thereof, said probe having a housing divided into separate fluid chambers by a lens with light transmitting means connected to radiate light to said lens via one fluid chamber and light conducting means arranged to conduct optical energy reflected/refracted by said lens as a result of the contents of another of said separate fluid chambers; and
means to convert optical energy to electrical energy for said electrical means to factor in the affect of density and contamination in the display means and indicate same as necessary separate of quantity display.

17. A liquid level gauge for fuel tanks comprising a light pipe vertical support within said tank, said support mounting paired light pipes generally perpendicular thereto in a close vertical sequence to be angularly related by intersecting axis and spaced by a cavity that is bridged and sealed by a clear optical interface that will upon a mismatched index of refraction, as when fuel is not fuel is not about said optical interface, permit light to reflect from a conducting light pipe on one side of said support to a transmitting light pipe paired therewith by the vertical support.

18. The gauge of claim 17 having electrical means operable by said other of the light pipes to provide display of fuel remaining in said tank.

19. The gauge of claim 18 wherein the paired light pipes are located to accommodate irregular shaped tanks.

20. The gauge of claim 18 wherein the electrical means is provided with devices to accommodate irregular shapped tanks.

21. The gauge of claim 18 wherein the electrical means includes devices to factor the electrical signals with electrical signals of density and contamination and provide display of pounds of fuel remaining, fuel density and a warning of fuel contamination.

22. The gauge of claim 18 in tandem with one or more gauges of the same construction with means to provide individual and total displays of fuel aboard an aircraft, its density and contamination above a desired level.

23. In a fluid level indicating system using light pipe technology based upon Snell's law to provide electrical energy of manageable levels for electrical display means the improvement of a means to factor in measurements of fluid density and contamination within the container being measured, said means comprising:
 a housing within the container;
 a lens within the housing between a first fluid chamber and a second fluid chamber;
 light transmitting means to radiate light into said first chamber to illuminate an end of said lens;
 a means to support a light conducting means at a preselected pitch with regard to said housing to receive optical energy reflected and refracted by said lens; and
 electrical means controlled by said optical energy of said light conducting means to provide signals to the electrical display means.

24. The structure of claim 23 wherein said second chamber is provisioned to expose the lens to the fluid within the container.

25. The structure of claim 23 wherein the means to support includes a block adjacent the lens at an angle to the housing and another block adjacent an end of the housing for the second chamber, said blocks mounting light pipe means.

26. The structure of claim 23 wherein said end of the lens is aspherical.

27. A means to measure density and distinguish fluids comprising:
 a housing having an internal chamber;
 a lens located within said housing between a first portion and a second portion of said chamber at an angle to expose a contoured end of the lens in the first portion and a side of the lens in the second portion, said first portion being a sealed chamber and said second portion being a chamber for the fluid whose density and constituents are to be obtained;
 means to transmit light to said lens via said air chamber whereby said lens will by its contoured end condense said light towards focal points determined by the contoured end;
 fiber optic means supported relative to said lens and said fluid chamber to receive optical energy reflected and refracted by the fluid lens interface and convey same to a remote location; and
 electrical means connected to said fiber optic means to provide electrical signals in accordance with optical energy to display devices to indicate fluid density and fluid contamination.

28. The means of claim 27 wherein the means to transmit includes fiber optic, light pipe means.

29. The means of claim 27 wherein the contoured end of the lens is aspherical.

30. The means of claim 28 wherein the contoured end of the lens is aspherical.

31. The means of claim 27 wherein the sealed chamber is an air chamber.

32. The means of claim 31 wherein the second portion is open to a fluid surrounding the housing.

33. The means of claim 32 wherein the housing is within a fuel tank.

34. The means of claim 29 wherein the focal points are at the side exposed to the fluid in the second portion and at an end opposite the aspherical end.

35. The means of claim 34 wherein the fiber optic means includes a portion related to the focal point along the side and another portion related to the focal point along the end opposite the aspherical end.

* * * * *

UNITED STATES PATENT AND TRADEMARK OFFICE
CERTIFICATE OF CORRECTION

PATENT NO. : 3,995,168
DATED : Nov. 30, 1976
INVENTOR(S) : Frederick Neuscheler and John J. Connelly It is certified that error appears in the above-identified patent and that said Letters Patent are hereby corrected as shown below:

Column 3, Line 40, delete "phase" and insert therefor --pipes--.

Column 6, Line 52, delete "terminate thereat; thereof;" and insert therefor ---cavity to terminate thereat---.

Column 8, Line 59, delete "fuel is not" second occurrence.

Signed and Sealed this

Twenty-ninth Day of March 1977

[SEAL]

Attest:

RUTH C. MASON
*Attesting Officer*

C. MARSHALL DANN
*Commissioner of Patents and Trademarks*